US012518954B2

(12) United States Patent
Ong et al.

(10) Patent No.: US 12,518,954 B2
(45) Date of Patent: Jan. 6, 2026

(54) HIGH-VOLTAGE MODULE AND MASS SPECTROMETER USING THE SAME

(71) Applicant: Hitachi High-Tech Corporation, Tokyo (JP)

(72) Inventors: Zihao Ong, Tokyo (JP); Takuma Nishimoto, Tokyo (JP); Isao Furuya, Tokyo (JP); Hiroshi Touda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 351 days.

(21) Appl. No.: 18/037,097

(22) PCT Filed: Dec. 28, 2021

(86) PCT No.: PCT/JP2021/048898
§ 371 (c)(1),
(2) Date: May 16, 2023

(87) PCT Pub. No.: WO2022/163297
PCT Pub. Date: Aug. 4, 2022

(65) Prior Publication Data
US 2023/0343572 A1 Oct. 26, 2023

(30) Foreign Application Priority Data
Jan. 27, 2021 (JP) ................................ 2021-010898

(51) Int. Cl.
*H01J 49/10* (2006.01)

(52) U.S. Cl.
CPC .................................... *H01J 49/10* (2013.01)

(58) Field of Classification Search
CPC ........................................................ H01J 49/10
See application file for complete search history.

(56) References Cited

U.S. PATENT DOCUMENTS 6,504,348 B2 1/2003 Stanley
2006/0001488 A1 1/2006 Ryoo et al.
(Continued)

FOREIGN PATENT DOCUMENTS

JP 01-162781 U1 11/1989
JP 2005-316788 A 11/2005
(Continued)

OTHER PUBLICATIONS

Extended European Search Report received in corresponding European Application No. 21923300.4 dated Sep. 16, 2024.
(Continued)

*Primary Examiner* — Nicole M Ippolito
(74) *Attorney, Agent, or Firm* — MATTINGLY & MALUR, PC

(57) ABSTRACT

A high-voltage module HVMD includes: an error amplifier configured to output a control signal based on a reference signal Vin and a feedback signal; a high voltage output circuit configured to output a high voltage Vout for supply based on the control signal; and a feedback circuit configured to output the feedback signal based on the high voltage Vout for supply. Here, the feedback circuit includes: a first partial circuit configured to receive an input of the high voltage Vout for supply and to output an intermediate signal, the first partial circuit including a resistance element; and a second partial circuit configured to receive an input of the intermediate signal and to output the feedback signal. The high-voltage module HVMD further includes a substrate SUB including: a high voltage substrate region where the high voltage output circuit and a part of the first partial circuit are mounted.

14 Claims, 9 Drawing Sheets

(56) References Cited

U.S. PATENT DOCUMENTS

| | | | | |
|---|---|---|---|---|
| 2007/0079710 | A1 | 4/2007 | Ishizaki | |
| 2013/0038385 | A1 | 2/2013 | Kodera et al. | |
| 2017/0338069 | A1* | 11/2017 | Reinhold | G05F 3/205 |
| 2021/0044239 | A1 | 2/2021 | Nakamura et al. | |
| 2021/0091217 | A1* | 3/2021 | Miyoshi | H10D 12/481 |

FOREIGN PATENT DOCUMENTS

| | | | |
|---|---|---|---|
| JP | 2006-74901 | A | 3/2006 |
| JP | 2007-96364 | A | 4/2007 |
| JP | 2009-003612 | A | 1/2009 |
| WO | 2017-145334 | A1 | 8/2017 |
| WO | 2019/187431 | A1 | 10/2019 |

OTHER PUBLICATIONS

International Search Report of PCT/JP2021/048898 dated Feb. 15, 2022.

* cited by examiner

[FIG. 1]
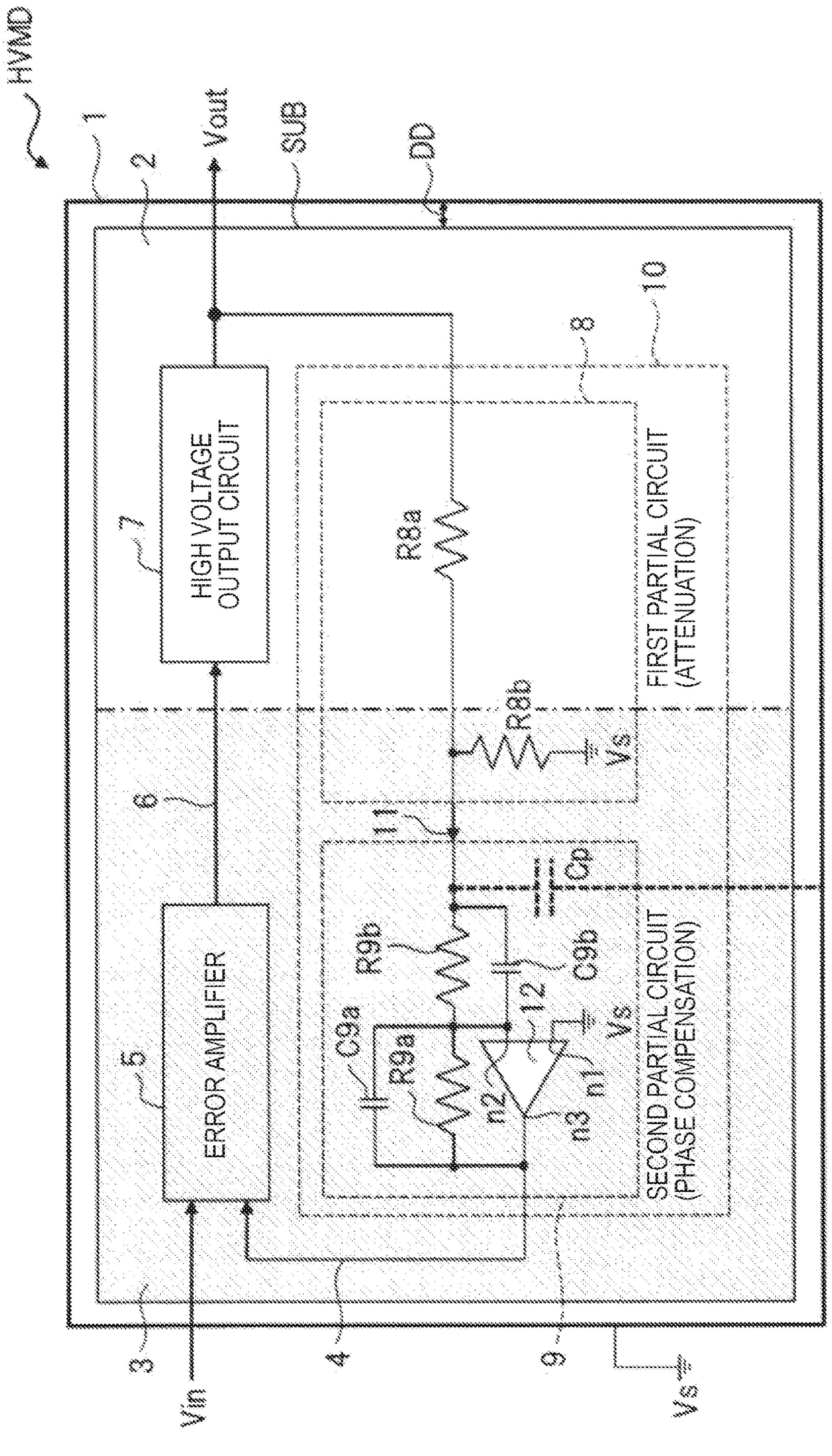

[FIG. 2]
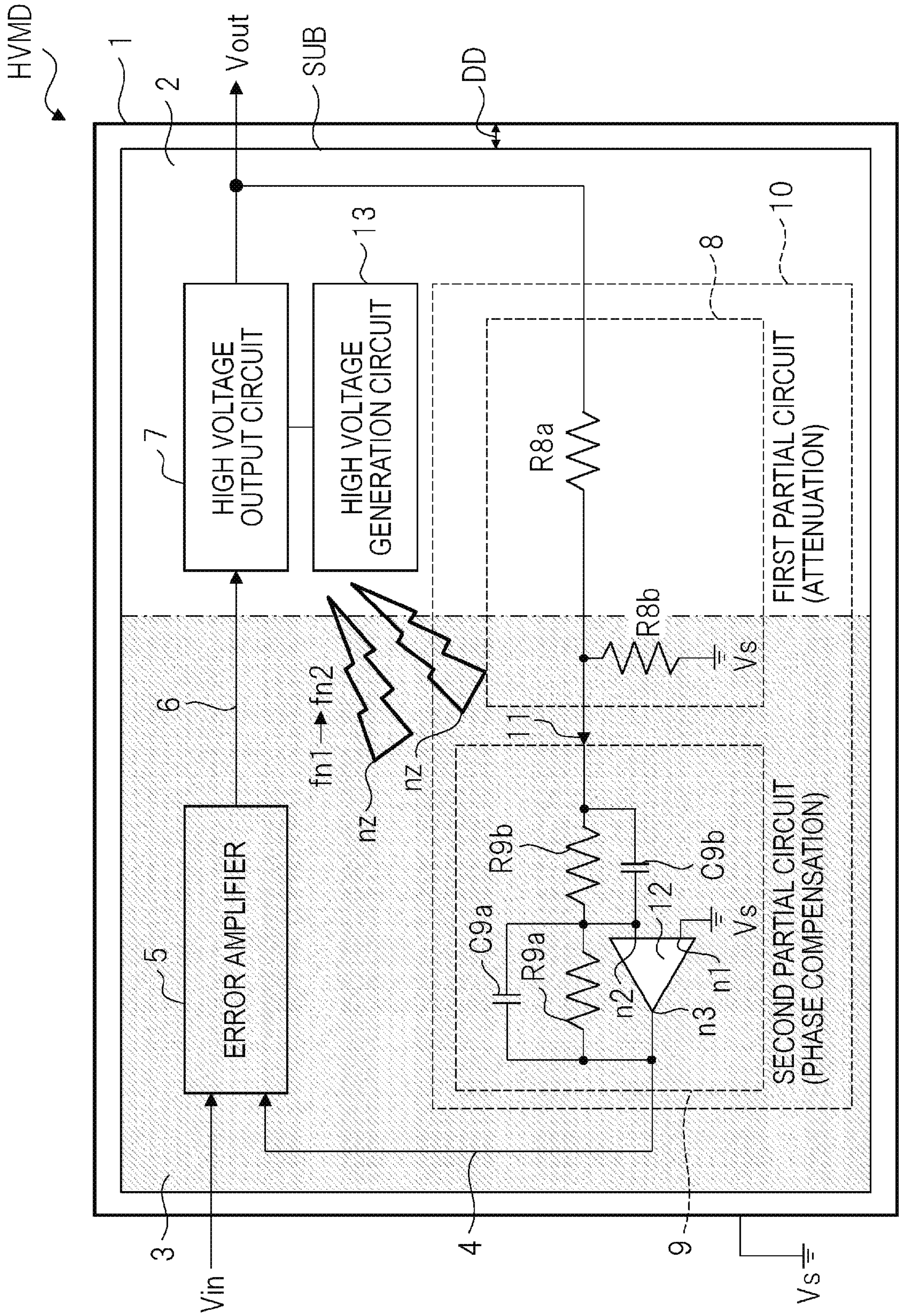

[FIG. 3]
(A)
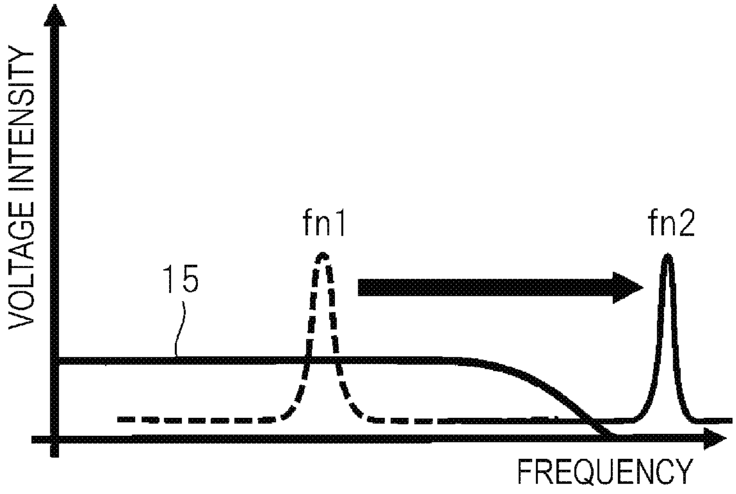
(B)
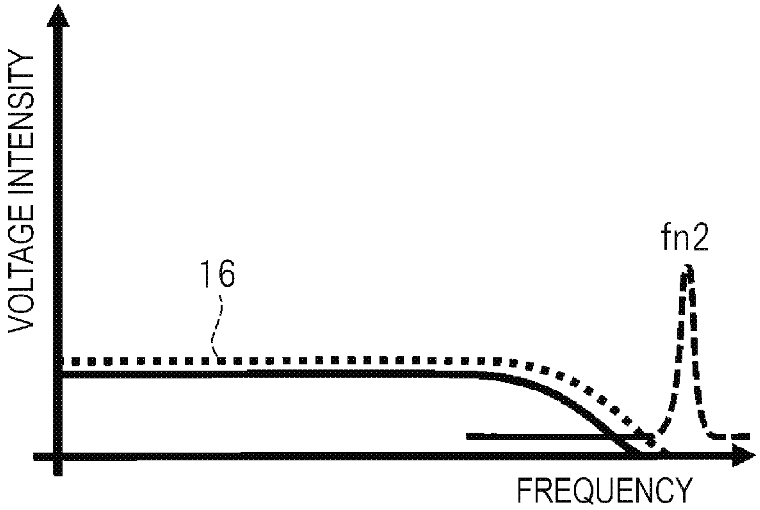

[FIG. 4]
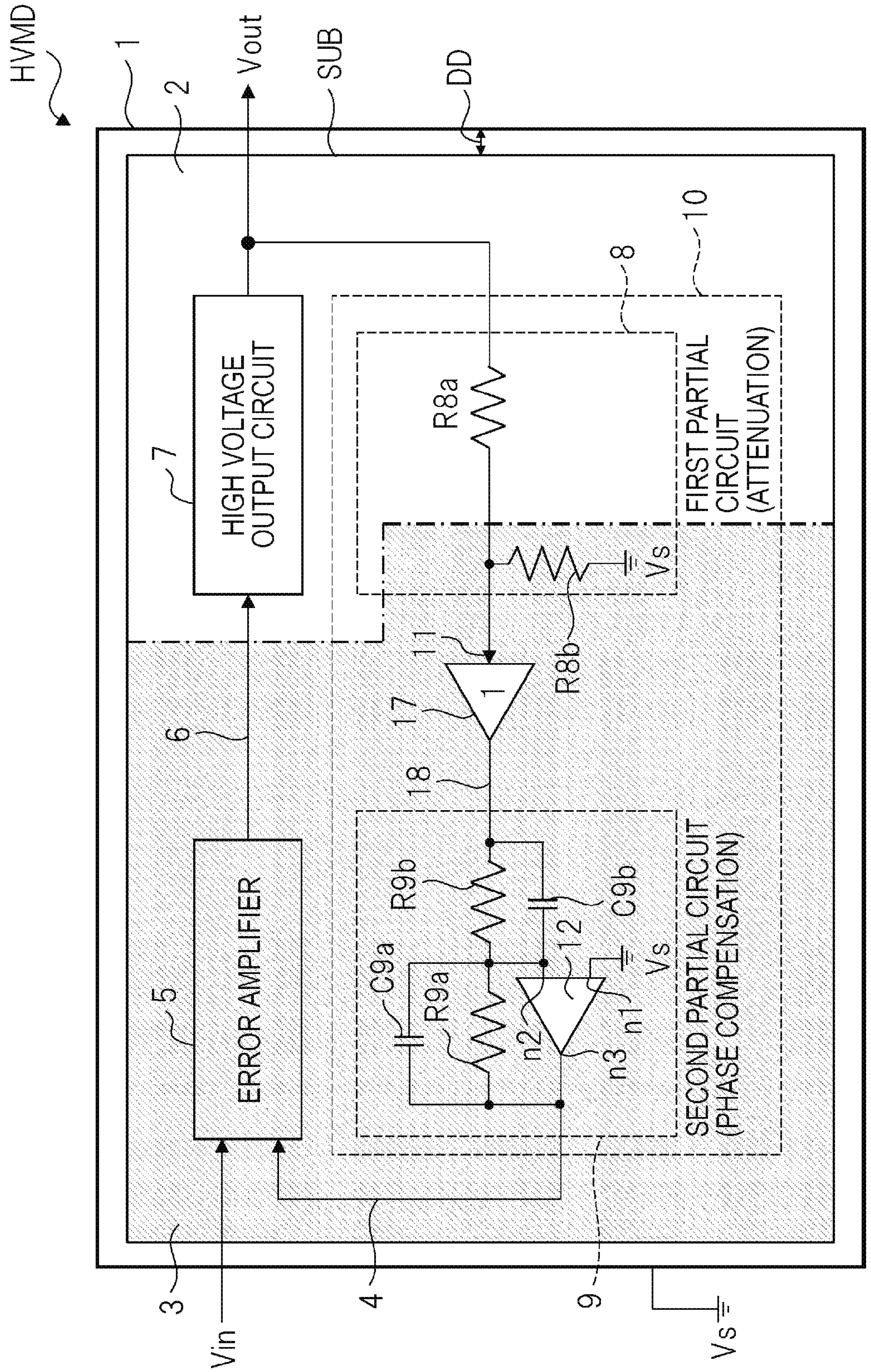

[FIG. 5]
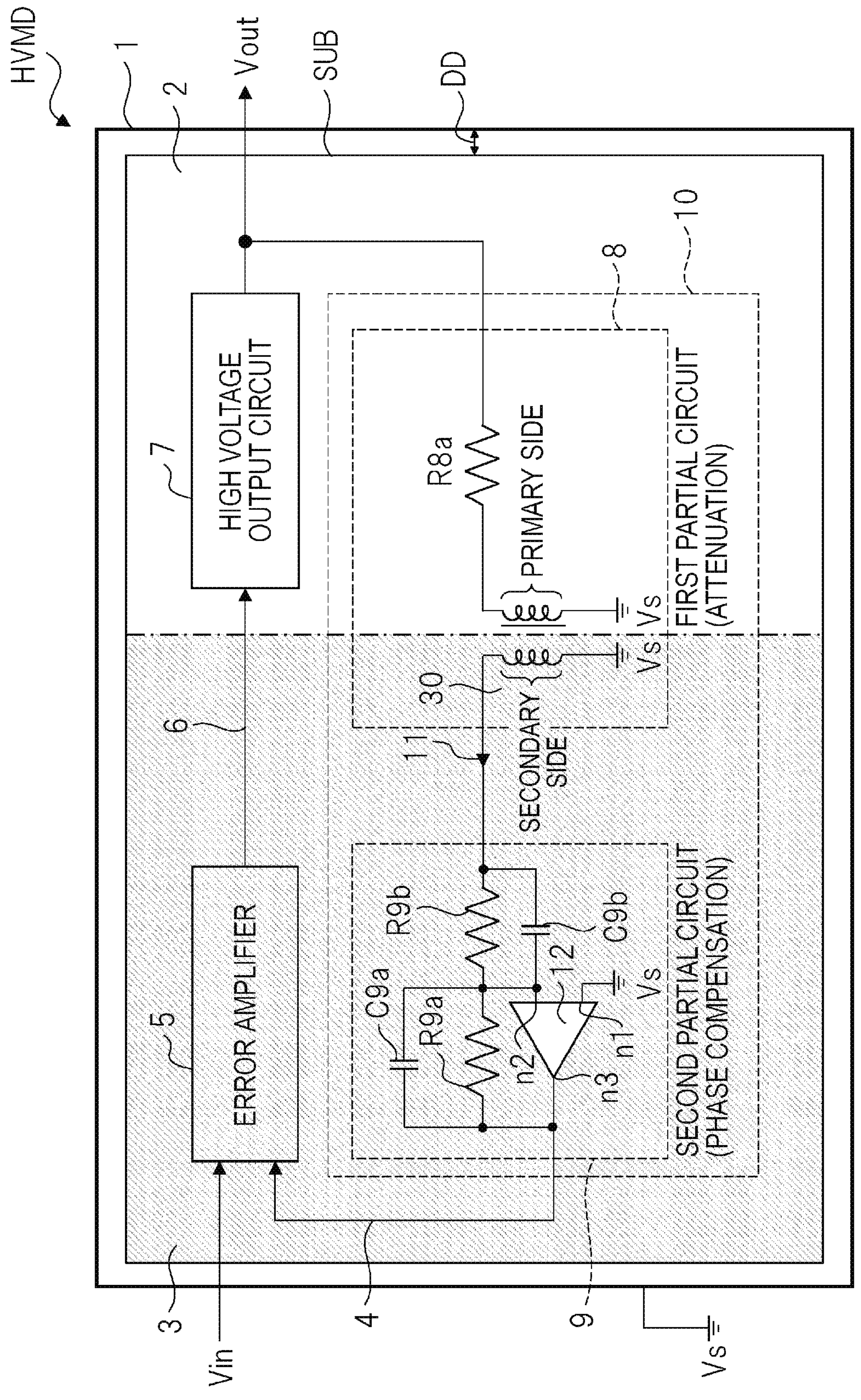

[FIG. 6]
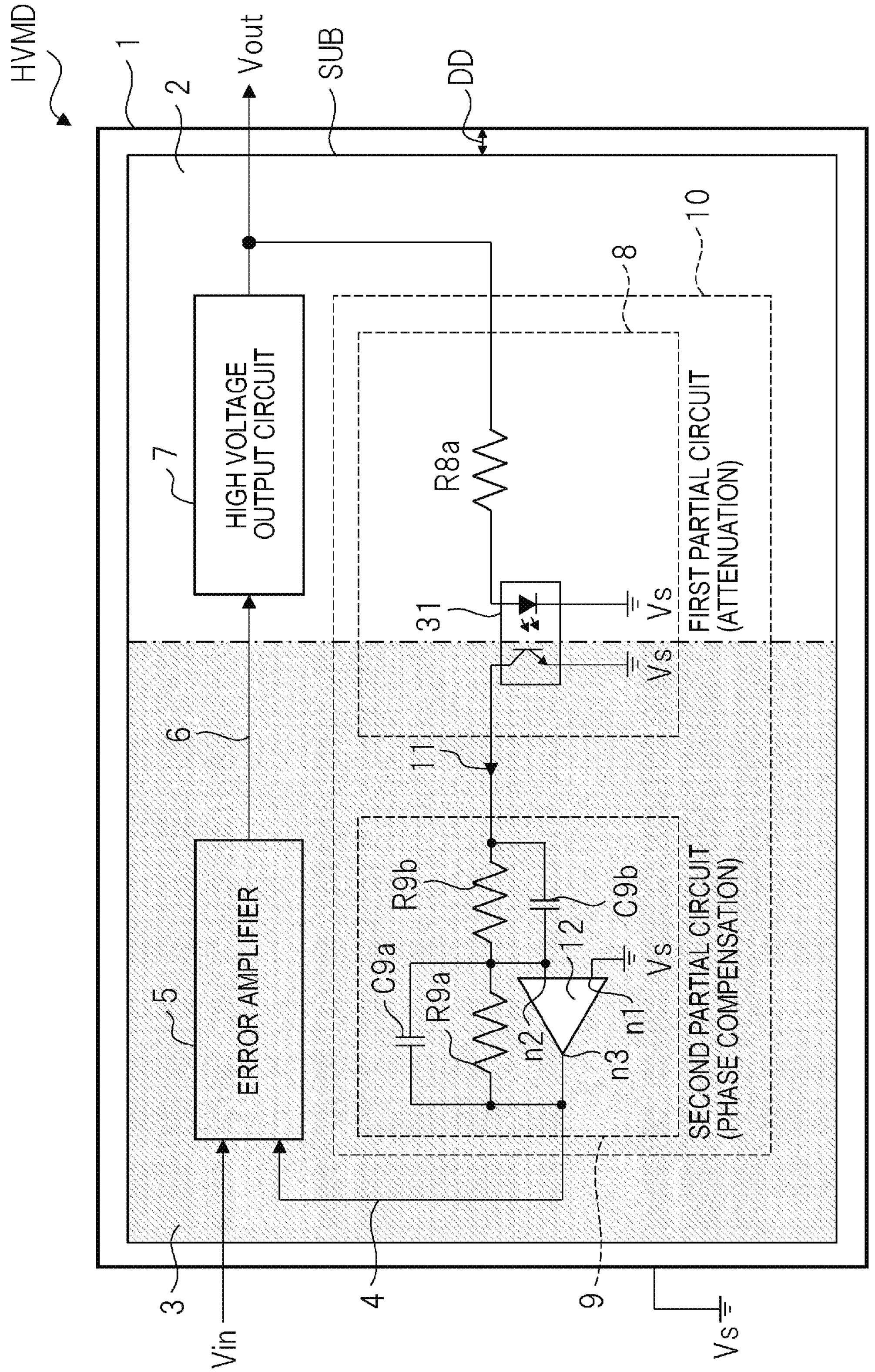

[FIG. 7]
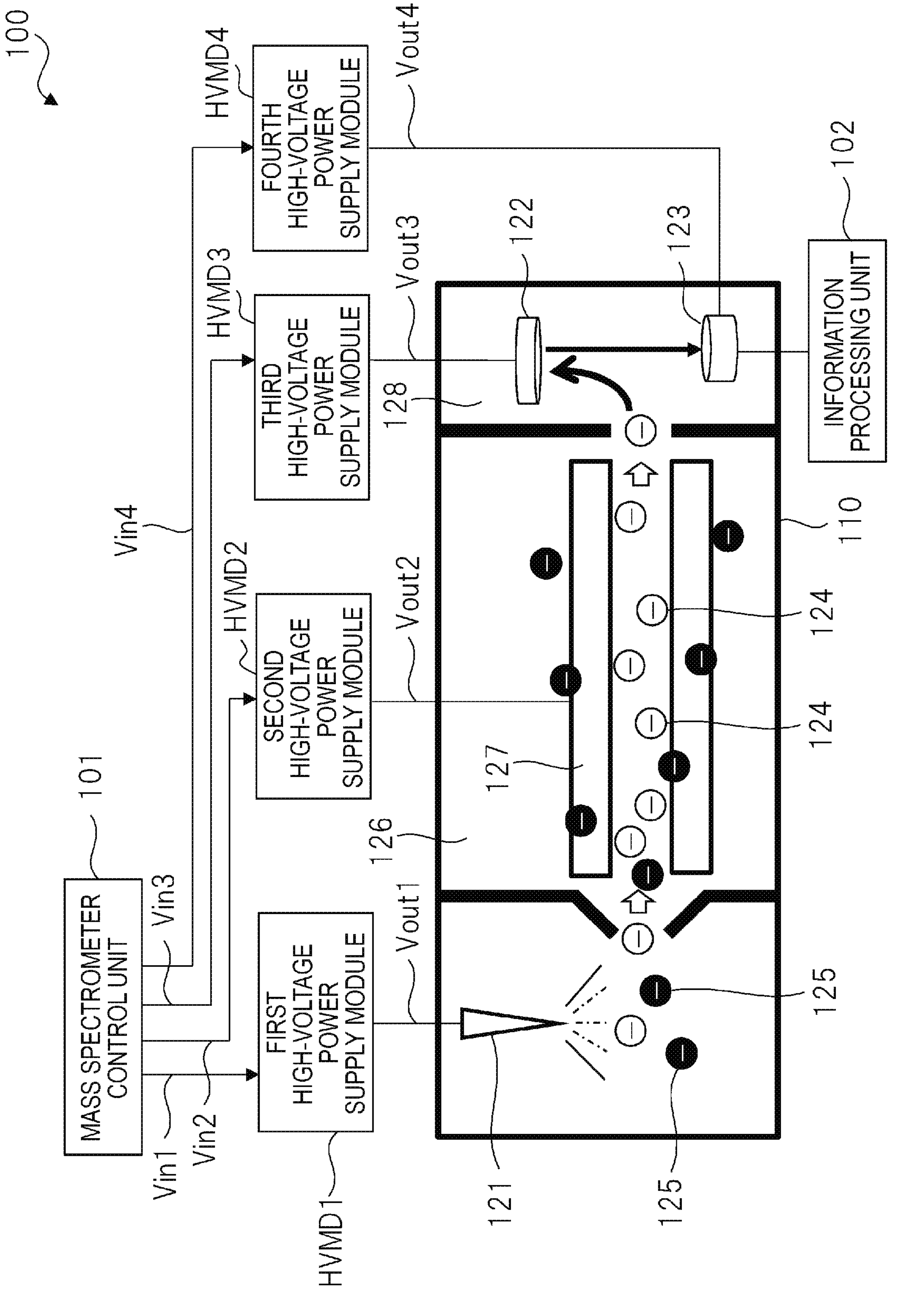

[FIG. 8]

$$\beta = \frac{R20b}{R20a + R20b} \quad \cdots\cdots (1)$$

$$f1 = \frac{1}{2\pi(R20a // R20b)(C20 + Cp)} \quad \cdots\cdots (2)$$

$$f2 = \frac{1}{2\pi R20aC20} \quad \cdots\cdots (3)$$

$$P = \frac{(V_{out} - V_{fb})^2}{R20a} \quad \cdots\cdots (4)$$

$$\beta' = \frac{R8b}{R8a + R8b} \quad \cdots\cdots (5)$$

$$f1' = \frac{1}{2\pi(R9a)(C9a + Cp)} \quad \cdots\cdots (6)$$

$$f2' = \frac{1}{2\pi(R9b)(C9b)} \quad \cdots\cdots (7)$$

[FIG. 9]
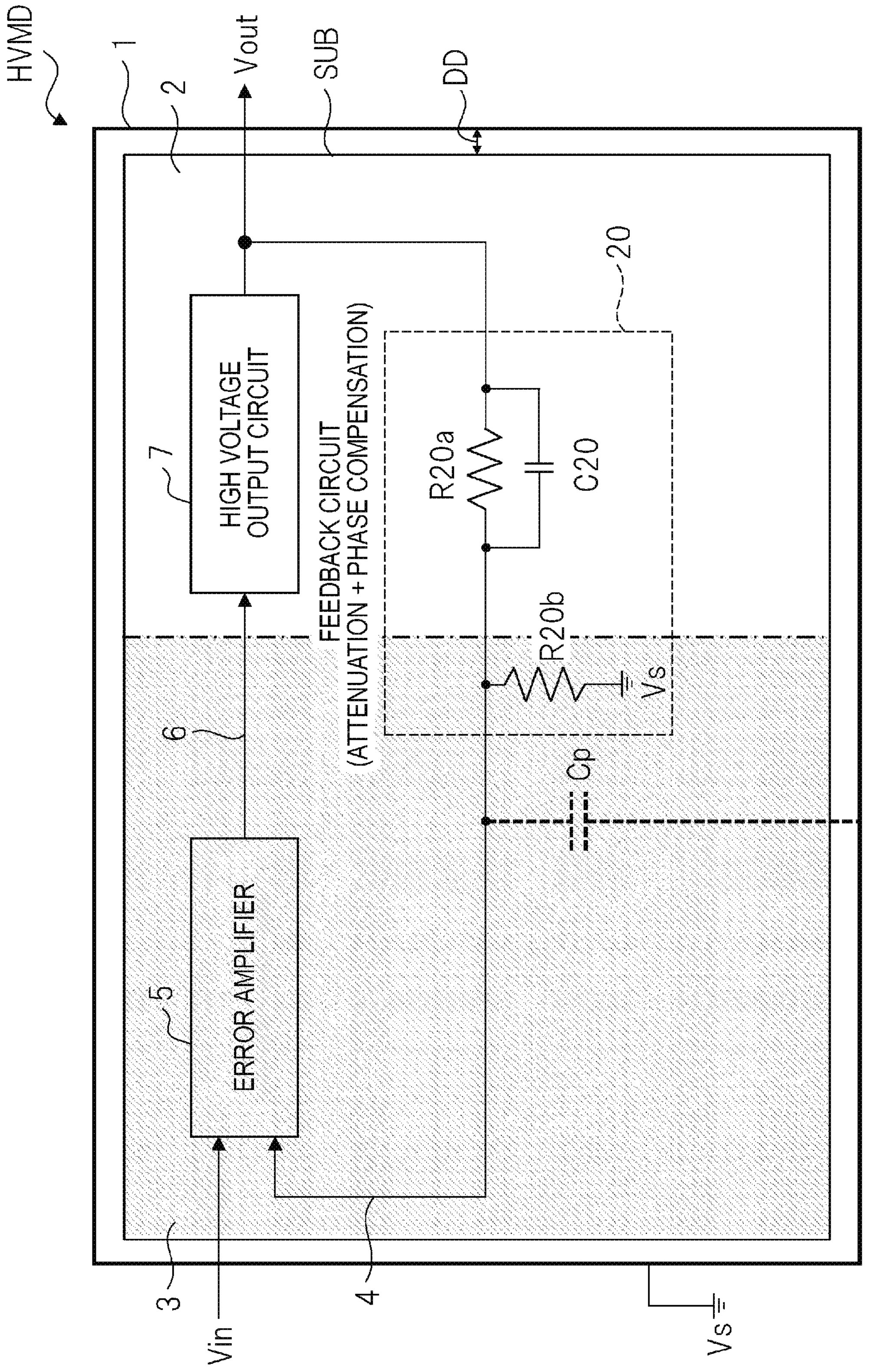

HIGH-VOLTAGE MODULE AND MASS SPECTROMETER USING THE SAME

TECHNICAL FIELD

The present invention relates to a high-voltage module that outputs a high voltage and a mass spectrometer using the same and, for example, relates to a high-voltage module that supplies a high voltage to an ion source, an ion filter, and/or a detector that is mounted on a mass spectrometer.

BACKGROUND ART

For example, when a drive circuit that drives a capacitive load is a high-voltage module, for example, PTL 1 describes the high-voltage module. PTL 1 describes that a digital voltage amplifier is added to a drive circuit to prevent heat generation and a buffer is added between an operational amplifier and a feedback circuit to improve stability.

CITATION LIST

Patent Literature

PTL 1: JP2007-96364A

SUMMARY OF INVENTION

Technical Problem

In the high-voltage module (hereinafter, also referred to as "high-voltage power supply module" for supplying a power supply voltage to a device such as a mass spectrometer), in general, when a reduction in power consumption is attempted, a reduction in speed or an unstable operation occurs in exchange for the reduction.

On the other hand, in a device on which the high-voltage power supply module is mounted, for example, in a mass spectrometer, to increase the throughput and the sensitivity of analysis, improvement of electrical characteristics such as higher speed or higher stability operation is required for the high-voltage power supply module to be mounted. Concurrently, from the viewpoint of usability, low power consumption is also required for the high-voltage power supply module to enable easy heat dissipation design or miniaturization. Accordingly, for the high-voltage power supply module, simultaneous achievement of improvement of electrical characteristics and low power consumption is an issue.

To prevent electrocution or reduce noise radiation, a substrate mounted with the high-voltage power supply module is accommodated in a metallic (conductive) housing connected to a ground voltage or the like, and the high-voltage power supply module integrated with the metallic housing is mounted on the device. As described above, when the miniaturization of the high-voltage power supply module is attempted, the distance between the metallic housing and the substrate decreases. Undesired parasitic capacitance components occur between the substrate and the metallic housing. However, when the distance between the metallic housing and the substrate decreases, the parasitic capacitance components that occur increase in inverse proportion to the distance. To improve the insulating properties of the high-voltage power supply module, the metallic housing that accommodates the substrate may be filled with insulating resin. The parasitic capacitance components that occur increase in proportion to the dielectric constant between the substrate and the metallic housing in addition to the distance between the metallic housing and the substrate. Therefore, when the insulating resin has a higher dielectric constant than air, the parasitic capacitance components further increase. That is, by achieving the miniaturization and the improvement of insulating properties in the high-voltage power supply module, the distance between the substrate and the housing decreases and the dielectric constant increases such that the parasitic capacitance components that occur increase accordingly. When the parasitic capacitance components increase, the high-voltage power supply module undergoes a low-speed operation and/or an unstable operation.

In PTL 1, by adding the digital voltage amplifier instead of an analog amplifier, a voltage of a digital signal of which a pulse width is modulated by a pulse width modulator is amplified. As a result, heat generation can be prevented. By adding the buffer between the operational amplifier and the feedback circuit, the influence of the feedback circuit on a loop gain that is determined by the operational amplifier is reduced, and prevention of the heat generation and stability of the drive circuit can be simultaneously achieved.

However, in the technique described in PTL 1, as the output voltage increases, the current flowing through the feedback circuit increases, and the amount of heat generated also increases in proportion thereto. Therefore, to prevent the heat generation of the feedback circuit without a heat sink, a resistance value needs to be designed to be high. Here, not only the operational amplifier but also the feedback circuit is a circuit component that determines the loop gain. Therefore, the parasitic capacitance components occurring between the metallic housing that accommodates the drive circuit and the substrate on which the drive circuit is mounted strongly affect the stability of the entire drive circuit. PTL 1 neither describes nor recognizes the influence of the parasitic capacitance components occurring between the metallic housing and the substrate.

An object of the present invention is to provide a high-voltage module capable of a stable high-speed operation at a low power consumption.

Other objects and new characteristics of the present invention will be clarified with reference to description of the specification and the accompanying drawings.

Solution to Problem

The summary of a representative embodiment disclosed in the present application will be simply described as follows.

That is, a high-voltage module includes: an error amplifier configured to output a control signal based on a reference signal and a feedback signal; a high voltage output circuit configured to output a high voltage for supply based on the control signal; and a feedback circuit configured to output the feedback signal based on the high voltage for supply. The feedback circuit includes: a first partial circuit configured to receive an input of the high voltage for supply and to output an intermediate signal, the first partial circuit including a resistance element; and a second partial circuit configured to receive an input of the intermediate signal and to output the feedback signal. The high-voltage module includes a substrate including: a high voltage substrate region where the high voltage output circuit and a part of the first partial circuit are mounted; and a low voltage substrate region where the error amplifier and the second partial circuit are mounted. The second partial circuit includes a resistance element and a capacitive element that relate to a loop gain of the feedback circuit.

Advantageous Effects of Invention

The summary of an effect obtained by the representative embodiment of the present invention disclosed in the present application will be simply described as follows. A high-voltage module capable of a stable high-speed operation at a low power consumption can be provided.

BRIEF DESCRIPTION OF DRAWINGS

FIG. 1 is a circuit diagram illustrating a configuration of a high-voltage module according to a first embodiment.

FIG. 2 is a circuit diagram illustrating a configuration of a high-voltage module according to a second embodiment.

FIG. 3(A) and FIG. 3(B) are characteristic diagrams illustrating the second embodiment.

FIG. 4 is a circuit diagram illustrating a configuration of a high-voltage module according to a third embodiment.

FIG. 5 is a circuit diagram illustrating a configuration of a high-voltage module according to a fourth embodiment.

FIG. 6 is a circuit diagram illustrating a configuration of a high-voltage module according to a modification example of the fourth embodiment.

FIG. 7 is a schematic view illustrating a configuration of a mass spectrometer according to a fifth embodiment.

FIG. 8 is a diagram illustrating expressions for describing the high-voltage module according to the first embodiment.

FIG. 9 is a circuit diagram illustrating a configuration of a high-voltage module according to Comparative Example.

DESCRIPTION OF EMBODIMENTS

Embodiments of the present invention will be described with reference to the drawings. The embodiments described below do not limit the present inventions according to the claims, and all the elements described in the embodiments and combinations thereof are not necessarily indispensable for solving means of the invention.

First Embodiment

FIG. 1 is a circuit diagram illustrating a configuration of a high-voltage module according to a first embodiment. In FIG. 1, HVMD represents a high-voltage module. The high-voltage module HVMD includes: a substrate (for example, a printed board) SUB on which the high-voltage module is mounted; and a metallic housing 1 that accommodates the substrate SUB. The mounting of the high-voltage module on the substrate SUB is implemented, for example, by mounting elements that configure the high-voltage module and wirings and the like that connect the elements and the like to each other on the substrate SUB.

To prevent electrocution and to reduce noise radiation, the metallic housing 1 is electrically connected to a predetermined low voltage such as a ground voltage Vs. In FIG. 1, a distance between the substrate SUB accommodated in the metallic housing 1 and the metallic housing 1 is represented by reference sign DD. In FIG. 1, a gap having the distance DD is provided between the metallic housing 1 and the substrate SUB. However, the present invention is not limited thereto. For example, the metallic housing 1 and the substrate SUB disposed in the metallic housing 1 may abut against each other. The metallic housing 1 may be disposed to cover the entire surface of the substrate SUB or to cover a part of the substrate SUB.

The substrate SUB is configured by a plurality of substrate regions, and two substrate regions 2 and 3 among the plurality of substrate regions are illustrated in FIG. 1. The substrate region 2 represents a high voltage substrate region, and the substrate region 3 indicated by hatched lines in FIG. 1 represents a low voltage substrate region. When the substrate SUB is one common substrate, the high voltage substrate region 2 and the low voltage substrate region 3 are exclusively disposed on the substrate SUB, and the high voltage substrate region 2 and the low voltage substrate region 3 are independent of each other.

The high voltage substrate region 2 and the low voltage substrate region 3 have different highest voltage value of a voltage used in the circuit (the circuit configured by the elements, the wirings, and the like that are mounted) that is mounted on each of the substrate regions. In the first embodiment, although not particularly limited, the voltage value of the highest voltage used in the circuit mounted in the high voltage substrate region 2 is, for example, 300 (V) or higher, and the voltage value of the highest voltage used in the circuit mounted in the low voltage substrate region 3 is, for example, lower than 300 (V). Of course, the circuit (the element, the wirings, and the like) used at the voltage of lower than 300 (V) may also be mounted in the high voltage substrate region 2.

The substrate SUB that is accommodated in the metallic housing 1 may be configured by a plurality of individual substrates. Here, for example, the high voltage substrate region 2 is configured by one individual substrate, and the low voltage substrate region 3 is configured by another individual substrate different from that of the high voltage substrate region 2.

A reference signal Vin is supplied to the high-voltage module HVMD, and the high-voltage module HVMD outputs a high voltage Vout for stable high-speed supply based on the reference signal Vin. The reference signal Vin is a signal for designating a voltage value of the high voltage Vout for supply as target, and may be an analog voltage signal having a low voltage or may be a digital signal having a low voltage. The reference signal Vin is supplied to the high-voltage module HVMD, for example, from a computer or a control unit. When the reference signal Vin is an analog signal, the voltage value of the reference signal Vin is a voltage value lower than the high voltage Vout for supply.

<High-Voltage Module>

Next, a circuit configuration of the high-voltage module HVMD will be described. The high-voltage module HVMD includes an error amplifier 5, a high voltage output circuit 7, and a feedback circuit 10.

The error amplifier 5 receives an input of the reference signal Vin and a feedback signal 4, amplifies a difference between the reference signal Vin and the feedback signal 4, and outputs the amplified difference as a control signal 6. The error amplifier 5 includes, for example, an operational amplifier that is supplied with the reference signal Vin and the feedback signal 4 and outputs the control signal 6. When the reference signal Vin is a digital signal, the error amplifier 5 includes a converter circuit that converts the digital signal into an analog signal having a low voltage and supplies the analog signal to the operational amplifier.

The high voltage output circuit 7 receives an input of the control signal 6 and outputs the high voltage Vout for supply having a voltage value based on the control signal 6.

The feedback circuit 10 receives an input of the high voltage Vout for supply as a high voltage signal and outputs the feedback signal 4 based on the high voltage signal. The feedback circuit 10 has the following two functions. That is, the first function is a signal attenuation function of attenuating the high voltage signal into a low voltage signal to determine an attenuation coefficient in an operating frequency range of the high-voltage module. The second function is a phase compensation function of determining a loop gain in stability design of the high-voltage module HVMD.

Comparative Example

In a feedback circuit of a high-voltage module in the related art, the signal attenuation function and the phase compensation function are implemented by combining a resistance element and a capacitive element. A configuration of the high-voltage module in the related art will be described using Comparative Example. FIG. 9 is a circuit diagram illustrating the configuration of the high-voltage module according to Comparative Example. A difference between FIG. 1 and FIG. 9 is that the feedback circuit is changed and is represented by reference sign 20 in FIG. 9.

The feedback circuit 20 includes feedback resistance elements R20*a* and R20*b* and a feedback capacitive element C20. Using a combination circuit that is configured by a combination of the feedback resistance elements R20*a* and R20*b* and the feedback capacitive element C20, both of the signal attenuation function and the phase compensation function are implemented. The feedback resistance element R20*a* and the feedback capacitive element C20 are connected in parallel, one end portion of the RC circuit that is configured by the parallel connection is connected to the high voltage Vout for supply, and another end portion of the RC circuit is connected to the ground voltage Vs through the feedback resistance element R20*b* and is also connected to the error amplifier 5. Here, the voltage of the feedback signal 4 is defined as Vfb.

In the design of the two functions, the feedback resistance elements R20*a* and R20*b* are shared, and thus affect each other. A problem caused when the feedback resistance elements R20*a* and R20*b* affect each other will be described below using an example.

In FIG. 9, Cp represents a parasitic capacitance equivalently representing parasitic capacitance components occurring between the substrate SUB and the metallic housing 1. FIG. 9 illustrates a case where the parasitic capacitance Cp occurs in a node where the feedback signal 4 is generated. Here, an attenuation coefficient β, of the feedback circuit 20, frequency bands f1 and f2 of phase compensation, and a power consumption P are schematically represented by Expressions (1) to (4) illustrated in FIG. 8.

For example, to reduce power consumption, the resistance value of the feedback resistance element R20*a* that attenuates the signal of the high voltage Vout for supply increases. As a result, as understood from Expression (4), the power consumption P can be reduced. On the other hand, as understood from Expression (3), the frequency band f2 of phase compensation as a part of the phase compensation function is determined depending on the product of the feedback resistance element R20*a* and the feedback capacitive element C20. Therefore, when the resistance value of the feedback resistance element R20*a* increases to reduce power consumption, the feedback capacitive element C20 having a lower capacitance value needs to be used to obtain the desired frequency band f2 of phase compensation.

As understood from Expression (2), when the capacitance value of the feedback capacitive element C20 is sufficiently higher than the parasitic capacitance Cp (Cp<<C20), the frequency band f1 of phase compensation can be determined regardless of the parasitic capacitance Cp. However, to obtain the desired frequency band f2 of phase compensation while reducing the power consumption, when the capacitance value of the feedback capacitive element C20 decreases, a relationship of Cp<<C20 collapses. To achieve the miniaturization of the high-voltage module, by reducing the distance DD of the gap between the substrate SUB and the metallic housing 1, the capacitance value of the parasitic capacitance Cp increases. Therefore, the influence of the parasitic capacitance Cp that occurs increases, and it is difficult to maintain the stability of the high-voltage module.

<Configuration of Feedback Circuit>

On the other hand, in the high-voltage module HVMD according to the first embodiment, as illustrated in FIG. 1, the feedback circuit 10 is separated into a first partial circuit 8 and a second partial circuit 9. The first partial circuit 8 is connected to the high voltage output circuit 7, is supplied with the high voltage signal of the high voltage Vout for supply, and outputs an intermediate signal 11 based on the high voltage signal. On the other hand, the second partial circuit 9 is connected to the error amplifier 5, is supplied with the intermediate signal 11, and outputs the feedback signal 4 to the error amplifier 5. The first partial circuit 8 has the attenuation function, and the second partial circuit 9 has the phase compensation function related to the loop gain.

In the substrate SUB, the high voltage output circuit 7 and a part (high voltage portion) of the first partial circuit 8 are mounted in the high voltage substrate region 2, and the error amplifier 5, the second partial circuit 9, and a part (low voltage portion) of the first partial circuit 8 are mounted in the low voltage substrate region 3. The reason is, in the high-voltage module according to the first embodiment, the highest voltage of the voltage used in the high voltage output circuit 7 and the high voltage portion of the first partial circuit 8 is 300 (V) or higher, and the highest voltage of the voltage used in the error amplifier 5, the second partial circuit 9, and the low voltage portion of the second partial circuit 9 is lower than 300 (V).

It may be considered that a wiring that transmits and receives a signal between the portion (the circuit and the elements) mounted in the high voltage substrate region 2 and the portion (the circuit and the elements) mounted in the low voltage substrate region 3, for example, a wiring that transmits the control signal 6 and the intermediate signal 11 is provided on the substrate SUB and is mounted in an intermediate substrate region (not illustrated) different from the high voltage substrate region 2 and the low voltage substrate region 3. A wiring that transmits the ground voltage Vs to the circuit, the elements, and the like is mounted on the substrate SUB regardless of the distinction between the high voltage substrate region 2, the low voltage substrate region 3, and the intermediate substrate region. As described above, when the high voltage substrate region 2 and the low voltage substrate region 3 are mounted on the individual substrates, respectively, it is desirable to mount the wiring that transmits the ground voltage Vs on each of the individual substrates. As a result, transmission of noise between the individual substrates can be reduced.

The first partial circuit 8 and the second partial circuit 9 are considered to have various configurations. Here, one example will be described using FIG. 1.

The first partial circuit 8 having the attenuation function includes: an output node of the high voltage output circuit 7;

and feedback resistance elements R8*a* and R8*b* that are connected in series between the ground voltages Vs. The high voltage signal from the high voltage output circuit 7 is divided by the feedback resistance elements R8*a* and R8*b* and is output as the intermediate signal 11 from the first partial circuit 8. That is, a ratio between the feedback resistance elements R8*a* and R8*b* is determined depending on an attenuation coefficient β' of the feedback circuit 10, and the high voltage signal of the high voltage Vout for supply is attenuated to the intermediate signal 11 having a low voltage. The attenuation coefficient β' is represented by Expression (5) illustrated in FIG. 8. The high voltage before the attenuation (the highest voltage of 300 (V) or higher) is applied (used) to the feedback resistance element R8*a*. Therefore, the feedback resistance element R8*a* is mounted in the high voltage substrate region 2 as the high voltage portion of the first partial circuit 8. On the other hand, the attenuated voltage is applied (used) to the feedback resistance element R8*b*. Therefore, the feedback resistance element R8*b* is mounted in the low voltage substrate region 3 as the low voltage portion of the first partial circuit 8. In the first embodiment, the attenuation is performed by the resistive voltage division. Therefore, the feedback resistance elements R8*a* and R8*b* may be considered as voltage-dividing resistance elements.

The second partial circuit 9 having the phase compensation function is configured by a phase compensation circuit including an operational amplifier 12, resistance elements (phase compensation resistance elements) R9*a* and R9*b*, and capacitive elements (phase compensation capacitive element) C9*a* and C9*b*. The resistance element R9*a* and the capacitive element C9*a* are connected in parallel between an input n2 of the operational amplifier 12 and an output n3 of the operational amplifier 12. The resistance element R9*a* and the capacitive element C9*a* are connected in parallel, one end portion of the RC circuit configured by the parallel connection is connected to the input n2 of the operational amplifier 12, and the intermediate signal 11 is supplied to another end portion of the RC circuit. An input n1 of the operational amplifier 12 is connected to the ground voltage Vs, and the feedback signal 4 is output from the output n3 of the operational amplifier 12. In the second partial circuit 9, a frequency band to be corrected can be obtained by the product of the resistance elements R9*a* and R9*b* and the capacitive elements C9*a* and C9*b*. In FIG. 1, Cp represents the parasitic capacitance described with reference to FIG. 9. FIG. 1 illustrates a case where the parasitic capacitance Cp occurs in the same node as in FIG. 9. Frequency bands f1' and f2' of phase compensation obtained by the second partial circuit 9 are represented by Expressions (6) and (7) in FIG. 8.

The second partial circuit 9 is mounted in the low voltage substrate region 3 and is supplied with the low voltage signal attenuated by the first partial circuit 8. Therefore, even when a resistance element having a lower resistance value than that when the second partial circuit 9 is mounted in the high voltage substrate region 2 is used, an increase in power consumption can be prevented. As a result, to achieve the correction in the desired frequency band, by combining the capacitive element C9*a* having a high capacitance value enough to ignore the value of the parasitic capacitance Cp and the resistance elements R9*a* and R9*b* having a low resistance value, the feedback circuit 10 can be implemented, and the influence of the parasitic capacitance Cp can be reduced.

As represented by Expressions (5) to (7), when the attenuation function and the phase compensation function are set, a shared element is not present. That is, the attenuation function is set by the resistance elements R8*a* and R8*b* as represented by Expression (5), and the phase compensation function is set by the resistance elements R9*a* and R9*b* and the capacitive elements C9*a* and C9*b* as represented by Expressions (6) and (7). Therefore, the feedback resistance elements R8*a* and R8*b* in the first partial circuit 8 can be set to a desired high resistance value for reducing the power consumption without affecting the stability of the high-voltage module. FIG. 1 illustrates the example where the resistive voltage division is used as the first partial circuit 8. However, the present invention is not limited thereto. For example, the first partial circuit 8 may be configured using a configuration of an inverting amplifier circuit using an operational amplifier.

As described above, the feedback circuit 10 is separated into the circuits for the respective functions (the attenuation function and the phase compensation function), and the substrate region for mounting is further divided. As a result, the influence of the parasitic capacitance occurring between the housing and the substrate can be reduced, and a high-voltage module where low power consumption and a stable high-speed operation can be simultaneously achieved can be provided.

Second Embodiment

In a second embodiment, a high voltage generation circuit is provided in the high-voltage module HVMD illustrated in FIG. 1, and a high voltage generated by the high voltage generation circuit is supplied to the high voltage output circuit 7. The high voltage output circuit 7 operates using the high voltage from the high voltage generation circuit as a power supply and outputs the high voltage Vout for supply based on the control signal 6. In the high-voltage module according to the second embodiment, the high voltage generation circuit is provided. Therefore, for example, even when a high voltage is not supplied from the outside of the high-voltage module HVMD, the high voltage Vout for supply can be output. However, electromagnetic radiation of noise from the high voltage generation circuit provided in the high-voltage module HVMD is concerned. In the second embodiment, a high-voltage module where the influence of the radiation noise can be reduced can be provided.

FIG. 2 is a circuit diagram illustrating a configuration of the high-voltage module according to the second embodiment. Since FIG. 2 is similar to FIG. 1, a difference will be mainly described. The difference is that the high-voltage module HVMD illustrated in FIG. 2 includes a high voltage generation circuit 13. At least a part of the high voltage generation circuit 13 is mounted in the high voltage substrate region 2, and a high voltage generated by the high voltage generation circuit 13 is supplied to the high voltage output circuit 7 as a power supply.

The high voltage generation circuit 13 is configured by a booster circuit that is drive based on a drive signal having a predetermined drive frequency. As the booster circuit, for example, a Cockroft-Walton circuit is used. Of course, the booster circuit is not limited thereto, and a circuit that performs a switching operation based on the drive signal to generate a high voltage may be used.

The high voltage generation circuit 13 performs a switching operation based on a drive signal having a predetermined drive frequency to generate a high voltage. However, radiation noise is generated by the switching operation. In FIG. 2, the radiation noise is schematically represented by reference sign nz. The radiation noise nz is highly likely to particularly affect the low voltage circuit (the second partial circuit and the error amplifier 5) that is mounted in the low voltage substrate region 3 and executes a precise process.

As described in the first embodiment, to implement low power consumption and stable operation, the feedback circuit 10 is separated into the first partial circuit 8 and the second partial circuit 9, and the second partial circuit 9 is mounted in the low voltage substrate region 3. To reduce the influence of the parasitic capacitance Cp to stabilize the operation, the value of the capacitive element C9*b* needs to be high. Accordingly, the resistance values of the resistance elements R9*a* and R9*b* are set to be low. When the feedback circuit 10 is separated for the respective functions, the second partial circuit 9 that implements the phase compensation function is likely to adopt a configuration of a high-pass filter, and a noise gain with respect to a high-frequency noise is also high. Therefore, in principle, a configuration in which noise is likely to be received and is likely to be amplified is adopted. That is, in principle, the second partial circuit 9 is likely to be affected by the radiation noise nz. For example, when the radiation noise nz enters the second partial circuit 9, the radiation noise nz is amplified by the second partial circuit 9, the error amplifier 5, and the high voltage output circuit 7, and is superimposed on the high voltage Vout for supply. As a result, a voltage noise that is several times the intensity of the radiation noise nz occurring in the high voltage generation circuit 13 is superimposed on the high voltage Vout for supply and is output. Due to a load that is supplied by the high voltage Vout for supply, this high voltage noise may be unallowable.

In the second embodiment, the drive frequency of the drive signal for driving the high voltage generation circuit 13 is changed from fn1 to fn2. Next, the drive frequencies fn1 and fn2 will be described with reference to the drawings. FIG. 3 is a characteristic diagram illustrating the second embodiment. FIG. 3 illustrates images of the radiation noise intensity from the high voltage generation circuit 13 and the signal intensity of the signal treated by the second partial circuit 9.

In FIGS. 3(A) and 3(B), the horizontal axis represents the frequency, and the vertical axis represents the voltage intensity. The high voltage generation circuit 13 performs the switching operation at the drive signal having the drive frequency fn1. Therefore, the high voltage generation circuit 13 generates radiation noise having a peak near the drive frequency fn1 as illustrated in FIG. 3(A).

The signal intensities of the output signal of the feedback circuit 20 in Comparative example illustrated in FIG. 9 and the intermediate signal 11 illustrated in FIG. 1 are basically the same value as long as the attenuation coefficients of the feedback circuit 20 and the first partial circuit 8 are the same. However, in the second partial circuit 9 to which the intermediate signal 11 is supplied, as described above, the noise gain is high, and the configuration of the high-pass filter is adopted. Therefore, the radiation noise is likely to be amplified. When the radiation noise is within the signal band of the feedback circuit 10, it is considered to provide a low-pass filter (LPF) that can remove the radiation noise. However, there may be a case where the LPF also attenuates the original signal. Therefore, in the second embodiment, after moving the radiation noise to a higher bandwidth side to separate the original signal and the radiation noise from each other, the radiation noise is removed by the LPF.

More specifically, in the first embodiment, a part (the second partial circuit 9 and the feedback resistance element R8*b*) of the feedback circuit 10 is mounted in the low voltage substrate region 3, and the intermediate signal 11 supplied to the second partial circuit 9 is the low voltage signal. That is, the voltage intensity of the signal treated by the second partial circuit 9 is low. In FIG. 3(A), a solid line 15 indicates a characteristic of the voltage intensity of the second partial circuit 9. The radiation noise is present in a lower frequency band than a cutoff frequency at which the characteristic 15 is attenuated, and the voltage intensity of the radiation noise exceeds the voltage intensity of the characteristic 15. Therefore, the second partial circuit 9 is strongly affected by the radiation noise. Since the radiation noise is present in the frequency band lower than the cutoff frequency, it is difficult to separate the radiation noise.

In the second embodiment, the drive frequency of the drive signal of the high voltage generation circuit 13 is changed from fn1 to the frequency fn2 higher than the operating frequency band of the high-voltage module HVMD. As a result, as illustrated in FIG. 3(B), the peak of the radiation noise shifts from the vicinity of the drive frequency fn1 to the vicinity of the drive frequency fn2. As a result, the radiation noise moves to the frequency band higher than the cutoff frequency of the second partial circuit 9. Therefore, the radiation noise can be separated.

In the second embodiment, the resistance element R9*a* and the capacitive element C9*a* provided in the second partial circuit 9 also function as the low-pass filter (LPF). The frequency characteristic (frequency filter characteristic) of the low-pass filter implemented by the resistance element R9*a* and the capacitive element C9*a* is indicated by a characteristic 16 in FIG. 3(B). That is, in the second partial circuit 9, the low-pass filter that removes the radiation noise near the drive frequency fn2 is configured. As a result, the radiation noise in the high frequency band that propagates to the low-pass filter implemented by the resistance element R9*a* and the capacitive element C9*a* can be removed. That is, noise generated by the electromagnetic radiation of the high voltage generation circuit 13 can be reduced.

With the high-voltage module according to the second embodiment, low power consumption and a stable high-speed operation can be achieved as in the first embodiment, and low noise can also be achieved.

Third Embodiment

A third embodiment provides a high-voltage module that is suitable when impedances of the first partial circuit 8 and the second partial circuit 9 provided in the feedback circuit 10 do not match with each other or impedance characteristics thereof interfere with each other.

FIG. 4 is a circuit diagram illustrating a configuration of the high-voltage module according to the third embodiment. Since FIG. 4 is similar to FIG. 1, a difference will be mainly described. In FIG. 4, the difference is that an impedance matching circuit 17 is added between the first partial circuit 8 and the second partial circuit 9.

Here, an example where an output impedance of the first partial circuit 8 and an input impedance of the second partial circuit 9 do not match with each other will be described as an example. By connecting the impedance matching circuit 17 between the output of the first partial circuit 8 and the input of the second partial circuit 9, the matching between the impedance characteristics can be implemented.

In FIG. 4, the impedance matching circuit 17 is configured by an operational amplifier. That is, a voltage follower (hereinafter, also referred to as VF) circuit having an amplification factor of about 1 is configured by the operational amplifier and is used as the impedance matching circuit 17. The intermediate signal 11 is supplied to the VF circuit from the first partial circuit 8 as a front-stage, and the VF circuit outputs a matched signal 18 based on the intermediate signal 11 to the second partial circuit 9. As a result, the VF circuit receives the intermediate signal 11 as the output of the first partial circuit 8 at a high impedance, and outputs the matched signal 18 to the second partial circuit 9 at a low impedance. As a result, the impedance characteristics of the first partial circuit 8 and the second partial circuit 9 do not interfere with each other, and accurate signal transmission can be implemented.

In the third embodiment, when the impedance characteristics of the first partial circuit and the second partial circuit in the feedback circuit 10 interfere with each other, impedance matching can be performed, the feedback circuit 10 can be separated using the first partial circuit and the second partial circuit having various configurations, and a high-voltage module where low power consumption and a stable high-speed operation can be simultaneously achieved can be provided as in the first embodiment.

Fourth Embodiment

A fourth embodiment provides a high-voltage module in which the high voltage substrate region and the low voltage substrate region can be electrically insulated from each other.

FIG. 5 is a circuit diagram illustrating a configuration of a high-voltage module according to a fourth embodiment. Since FIG. 5 is similar to FIG. 1, only a difference will be described. The difference is that the first partial circuit is changed.

In FIG. 1, when the intermediate signal 11 is output from the feedback resistance element R8*a*, the intermediate signal 11 crosses both of the high voltage substrate region 2 and the low voltage substrate region 3. To electrically insulate the regions from each other, in FIG. 5, the first partial circuit 8 is configured by the feedback resistance element R8*a* and a transformer 30. That is, the feedback resistance element R8*a* and a primary side of the transformer 30 are connected in series between the high voltage signal of the high voltage Vout for supply and the ground voltage Vs, and the intermediate signal 11 is output from a secondary side of the transformer 30. The primary side of the transformer 30 and the feedback resistance element R8*a* are mounted in the high voltage substrate region 2, and the secondary side of the transformer 30 is mounted in the low voltage substrate region 3. An attenuation factor of the first partial circuit 8 is determined depending on a turns ratio between the primary side and the secondary side of the transformer 30. The primary side and the secondary side of the transformer 30 are magnetically coupled with each other. Therefore, in the configuration illustrated in FIG. 5, signal transmission is magnetically performed, and thus the high voltage substrate region 2 and the low voltage substrate region 3 are electrically insulated from each other.

FIG. 5 illustrates the example where the attenuation factor of the first partial circuit 8 is determined depending on the turns ratio of the transformer 30. However, the resistive voltage division ratio illustrated in FIG. 1 may also be used in combination. For example, a voltage generated by resistive voltage division may be supplied to the primary side of the transformer 30, and the intermediate signal 11 may be output from the secondary side. Here, the attenuation factor of the first partial circuit 8 is determined depending on the turns ratio of the transformer 30 and the resistive voltage division ratio.

In FIG. 5, the example where a signal is magnetically transmitted is illustrated as an example of the insulating signal transmission circuit that electrically insulates the high voltage substrate region 2 and the low voltage substrate region 3 from each other. However, the insulating signal transmission circuit is not limited thereto. Hereinafter, an example where a signal is transmitted using light will be described as a modification example.

Modification Example

FIG. 6 is a circuit diagram illustrating a configuration of a high-voltage module according to a modification example of the fourth embodiment. Since FIG. 6 is similar to FIG. 5, a difference will be described. In FIG. 6, the difference is that the first partial circuit 8 is changed. The first partial circuit 8 is configured by the feedback resistance element R8*a* and a photocoupler 31. Here, the feedback resistance element R8*a* and an input of the photocoupler 31 are mounted in the high voltage substrate region 2, and an output of the photocoupler 31 is mounted in the low voltage substrate region 3. Here, the attenuation factor of the first partial circuit 8 is determined depending on a current transmission ratio (CTR) of the photocoupler 31.

Even in the modification example, the photocoupler 31 and the resistive voltage division ratio illustrated in FIG. 1 may be used in combination. In the combination, the attenuation factor of the first partial circuit 8 is determined depending on current transmission ratio of the photocoupler 31 and the resistive voltage division ratio.

FIGS. 5 and 6 illustrate an example where the first partial circuit 8 and the second partial circuit 9 are electrically insulated from each other. However, similarly, the error amplifier 5 and the high voltage output circuit 7 may also be electrically insulated from each other. Even here, the control signal 6 is transmitted from the error amplifier 5 to the high voltage output circuit 7 magnetically or using an optical signal. Of course, both of the intermediate signal 11 and the control signal 6 may be transmitted magnetically or using an optical signal.

With the above-described configuration, even when it is necessary to insulate the low voltage substrate region and the high voltage substrate region in the high-voltage power supply module from each other, the intermediate signal 11 and/or the control signal 6 can be transmitted magnetically or using an optical signal, and an insulated high-voltage module can be provided in addition to the effect described in the first embodiment.

Fifth Embodiment

Next, an example of a mass spectrometer (hereinafter, simply referred to as the spectrometer) on which the high-voltage module HVMD according to any one of the first to fourth embodiments is mounted will be described as a fifth embodiment. A spectrometer is a device used for inspecting the kind, amount, or the like of atoms forming a sample.

Here, a case where the high-voltage module described in the first embodiment is used as the high-voltage module HVMD will be described. However, the present invention is not limited thereto. For example, a combination of the high-voltage module HVMD described in the second to fourth embodiments or the high-voltage module HVMD described in the first to fourth embodiments may be mounted in the spectrometer.

FIG. 7 is a schematic view illustrating a configuration of the mass spectrometer according to the fifth embodiment. In FIG. 7, 100 represents the spectrometer (mass spectrometer). The spectrometer 100 includes a spectrometer housing 110, a mass spectrometer control unit (hereinafter, also referred to as the control unit) 101, a first high-voltage power supply module HVMD1 to a fourth high-voltage power supply module HVMD4, and an information processing unit 102.

The spectrometer housing 110 includes: an ion source 121 that ionizes a sample as a target of mass spectrometry; and a mass separation unit (ion filter) 126 that filters the ionized sample using a filter electrode 127 and allows permeation of only ion molecules having a mass as an analysis target. The spectrometer housing 110 further includes: a trajectory control unit 128 that controls a trajectory along which each of ion molecules and electrons moves; a conversion dynode 122 that converts ion molecules into electrons (electricity); and a detector 123 that detects the electrons. The conversion dynode 122 and the detector 123 are disposed in the trajectory control unit 128. In FIG. 7, 124 represents ions as a detection target, and 125 represents unnecessary ions.

The information processing unit 102 calculates the mass from an electric signal obtained by detector 123.

The first high-voltage power supply module HVMD1 to the fourth high-voltage power supply module HVMD4 are configured by the high-voltage module described in the first embodiment. The control unit 101 controls the first high-voltage power supply module HVMD1 to the fourth high-voltage power supply module HVMD4. In FIG. 7, the control unit 101 supplies reference signals Vin1 to Vin4 to the first high-voltage power supply module HVMD1 to the fourth high-voltage power supply module HVMD4 corresponding thereto, and the respective high-voltage power supply modules output high voltages Vout1 to Vout4 for supply based on the supplied reference signals. Hereinafter, the first high-voltage power supply module HVMD1 to the fourth high-voltage power supply module HVMD4 will also be referred to as the high-voltage module HVMD1 to HVMD4.

The reference signals Vin1 to Vin4 are low voltage signals having a voltage of lower than 100 (V), and the high voltages Vout1 to Vout4 for supply are high voltages having a voltage of 300 (V) or higher that are suitable for controlling the ionization or the trajectories of the ions. Therefore, in the high-voltage module used in the fifth embodiment, a highest voltage used in the low voltage substrate region 3 (FIG. 1) is lower than 100 (V), and a highest voltage used in the high voltage substrate region 2 (FIG. 1) is 300 (V) or higher.

In FIG. 7, although not particularly limited, voltage values of the high voltages suitable for the respective units provided in the spectrometer housing 110 are different from each other. Therefore, the high-voltage power supply module corresponding to each of the units is mounted. That is, the first high-voltage power supply module HVMD1 outputs the high voltage Vout1 for supply based on the reference signal Vint to the ion source 121, and the second high-voltage power supply module HVMD2 outputs the high voltage Vout2 for supply based on the reference signal Vin2 to the filter electrode 127 in the ion filter 126. The third high-voltage power supply module HVMD3 outputs the high voltage Vout3 for supply based on the reference signal Vin3 to the conversion dynode 122, and the fourth high-voltage power supply module HVMD4 outputs the high voltage Vout4 for supply based on the reference signal Vin4 to the detector 123.

FIG. 7 illustrates the example where the high voltages are supplied to the ion source 121, the ion filter 126, the conversion dynode 122, and the detector 123 from the high-voltage modules described in the first embodiment. However, the high voltage may be supplied from the high-voltage module described in the first embodiment to at least one among the above-described units.

When a high voltage having the same voltage value may be applied to each of the units provided in the spectrometer housing 110, one common high-voltage power supply module may be mounted. However, actually, due to the multi-functionalization of the spectrometer 100, it is necessary to supply high voltages having different voltage values to the respective units of the spectrometer housing 110. Therefore, it is necessary to mount the high-voltage power supply modules corresponding to the respective voltage values on the spectrometer 100, and the number of the high-voltage power supply modules also increases. In the high-voltage module according to the first embodiment, low power consumption can be implemented, which leads to a reduction in space required for heat dissipation design of each of the high-voltage power supply modules or improvement of usability such as easiness of the disposition in the spectrometer housing 110. The throughput and the detection sensitivity of the spectrometer 100 are determined depending on the stability, the high-speed operation, and the amount of noise of the high-voltage power supply module. Therefore, by combining the first embodiment and the second embodiment, the spectrometer 100 where high throughput and high sensitivity can be achieved can be provided.

Hereinabove, the present invention made by the present inventors has been described in detail based on the embodiments. However, the present invention is not limited to the embodiments, and it is needless to say that various modifications can be made within a range not departing from the scope of the present invention.

REFERENCE SIGNS LIST

1: metallic housing
2: high voltage substrate region
3: low voltage substrate region
5: error amplifier
7: high voltage output circuit
8: first partial circuit
9: second partial circuit
10: feedback circuit
13: high voltage generation circuit
100: mass spectrometer
C9*a*, C9*b*: capacitive element
Cp: parasitic capacitance
R8*a*, R8*b*: feedback resistance element
R9*a*, R9*b*: resistance element
DD: distance
HVMD, HVMD1 to HVMD4: high-voltage module
SUB: substrate
Vin, Vin1 to Vin4: reference signal
Vout, Vout1 to Vout4: high voltage for supply

The invention claimed is:

1. A high-voltage module comprising:
an error amplifier configured to output a control signal based on a reference signal and a feedback signal;
a high voltage output circuit configured to output a high voltage for supply based on the control signal; and a feedback circuit configured to output the feedback signal based on the high voltage for supply, wherein the feedback circuit includes a first partial circuit configured to receive an input of the high voltage for supply and to output an intermediate signal, the first partial circuit including a resistance element, and a second partial circuit configured to receive an input of the intermediate signal and to output the feedback signal, the high-voltage module further includes a substrate including a high voltage substrate region where the high voltage output circuit and a part of the first partial circuit are mounted, and a low voltage substrate region where the error amplifier and the second partial circuit are mounted, the second partial circuit includes a resistance element and a capacitive element that relate to a loop gain of the feedback circuit, and a highest voltage used in the high voltage substrate region is higher than a highest voltage used in the low voltage substrate region.

2. The high-voltage module according to claim 1, further comprising:

a high voltage generation circuit configured to be driven at a predetermined drive frequency and to generate a high voltage, wherein the high voltage output circuit uses the high voltage output from the high voltage generation circuit as a power supply to output the high voltage for supply based on the control signal, at least a part of the high voltage generation circuit is mounted in the high voltage substrate region, and a frequency filter characteristic of the second partial circuit includes a characteristic for removing the predetermined drive frequency.

3. The high-voltage module according to claim 1, wherein the high-voltage module is used as a power supply circuit.

4. A high-voltage module comprising:

an error amplifier configured to output a control signal based on a reference signal and a feedback signal;

a high voltage output circuit configured to output a high voltage for supply based on the control signal; and a feedback circuit configured to output the feedback signal based on the high voltage for supply, wherein the feedback circuit includes a first partial circuit configured to receive an input of the high voltage for supply and to output an intermediate signal, and a second partial circuit configured to receive an input of the intermediate signal and to output the feedback signal, the first partial circuit has a signal attenuation function of attenuating a high voltage signal of the high voltage for supply to a low voltage signal, the second partial circuit has a phase compensation function related to a loop gain of the high-voltage module, the high-voltage module further includes a substrate and a metallic housing that is accommodated in the substrate, the substrate including a high voltage substrate region where the high voltage output circuit and a part of the first partial circuit are mounted, and a low voltage substrate region where the error amplifier and the second partial circuit are mounted, and a highest voltage used in the high voltage substrate region is higher than a highest voltage used in the low voltage substrate region.

5. The high-voltage module according to claim 4, wherein the high voltage substrate region and the low voltage substrate region are exclusively disposed on the substrate.

6. The high-voltage module according to claim 4, wherein the substrate includes a plurality of individual substrates, and among the plurality of individual substrates, the high voltage substrate region is disposed on a first individual substrate and the low voltage substrate region is disposed on a second individual substrate different from the first individual substrate.

7. The high-voltage module according to claim 4, wherein the highest voltage used in the high voltage substrate region is 300 (V) or higher and the highest voltage used in the low voltage substrate region is lower than 300 (V).

8. The high-voltage module according to claim 4, wherein the metallic housing is electrically connected to a predetermined voltage.

9. The high-voltage module according to claim 4, further comprising:

a high voltage generation circuit configured to be driven at a predetermined drive frequency and to output a high voltage to the high voltage output circuit, at least a part of the high voltage generation circuit being mounted in the high voltage substrate region, wherein a frequency filter characteristic of the second partial circuit includes a characteristic for removing the drive frequency.

10. The high-voltage module according to claim 4, further comprising:

an impedance matching circuit connected between the first partial circuit and the second partial circuit.

11. The high-voltage module according to claim 4, wherein the first partial circuit and the second partial circuit are connected to each other by an insulating signal transmission circuit that is electrically insulated.

12. A mass spectrometer comprising:

an ion source configured to ionize a sample;

an ion filter configure to filter ions;

a detector configured to detect ions; and a high-voltage module configured to supply a high voltage to at least one among the ion source, the ion filter, and the detector, the high-voltage module including an error amplifier configured to output a control signal based on a reference signal and a feedback signal, a high voltage output circuit configured to output a high voltage for supply based on the control signal, and a feedback circuit configured to output the feedback signal based on the high voltage for supply, wherein the feedback circuit includes a first partial circuit configured to receive an input of the high voltage for supply and to output an intermediate signal, and a second partial circuit configured to receive an input of the intermediate signal and to output the feedback signal, the first partial circuit has a signal attenuation function of attenuating a high voltage signal of the high voltage for supply to a low voltage signal, the second partial circuit has a phase compensation function related to a loop gain of the high-voltage module, the high-voltage module includes a substrate and a metallic housing that accommodates the substrate, the substrate including a high voltage substrate region where the high voltage output circuit and a part of the first partial circuit are mounted, and a low voltage substrate region where the error amplifier and the second partial circuit are mounted, and a highest voltage used in the high voltage substrate region is higher than a highest voltage used in the low voltage substrate region.

13. The mass spectrometer according to claim 12, further comprising:

the high-voltage module corresponding to each of the ion source, the ion filter, and the detector.

14. The mass spectrometer according to claim 12, wherein the highest voltage used in the high voltage substrate region is 300 (V) or higher and the highest voltage used in the low voltage substrate region is lower than 100 (V).

* * * * *